United States Patent Office 2,968,859
Patented Jan. 24, 1961

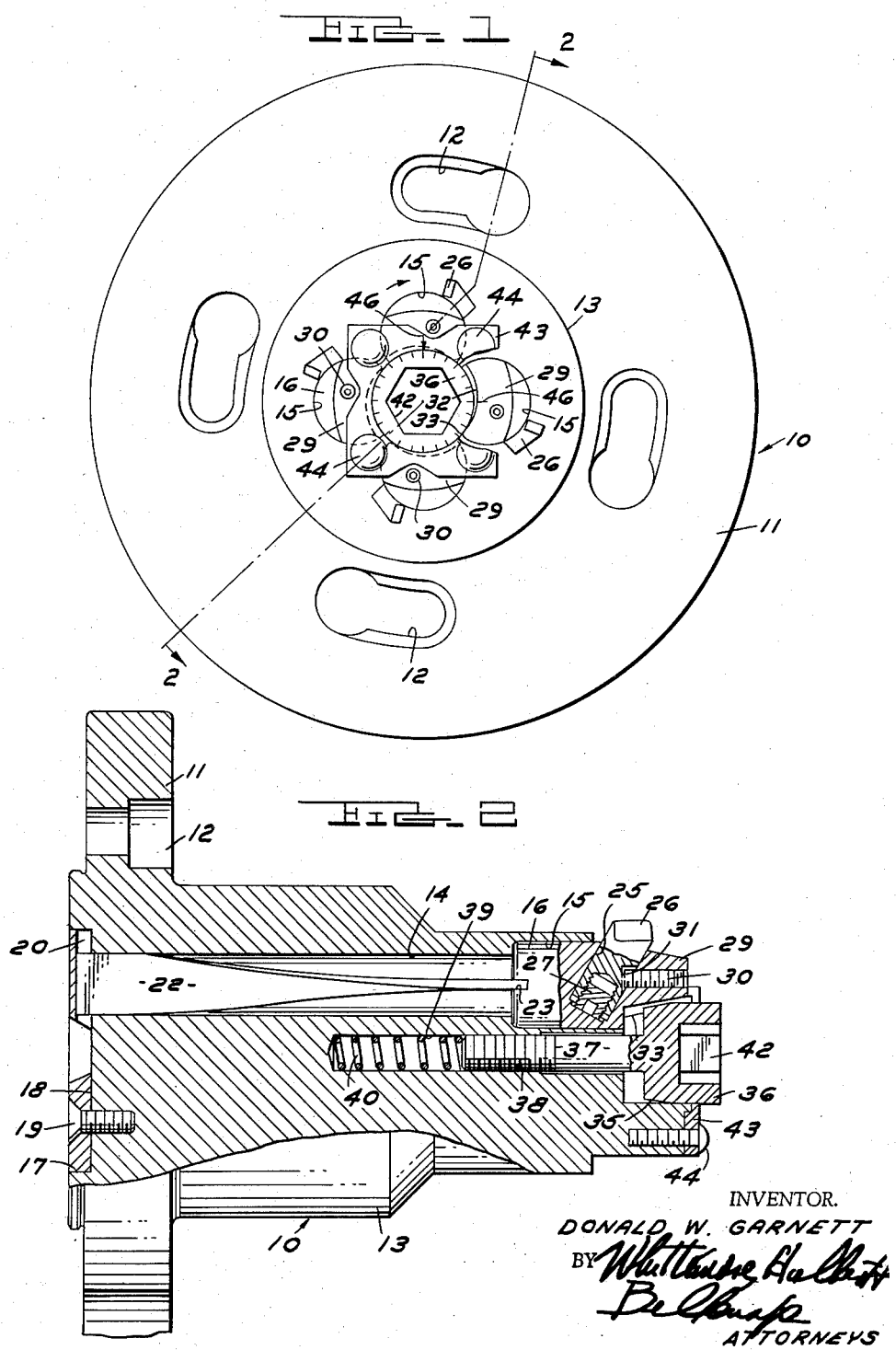

2,968,859

RADIALLY ADJUSTABLE ROTARY CUTTER

Donald W. Garnett, Grand Ledge, Mich., assignor to The Olofsson Corporation, Lansing, Mich., a corporation of Michigan Filed May 26, 1958, Ser. No. 737,863

13 Claims. (Cl. 29—105)

The present invention relates to improvements in an adjustable tool supporting unit for a machine tool, whereby a plurality of holders mounting cutting or like tool bits on said unit are simultaneously adjusted as to their effective radius. This is accomplished by a simple hand manipulation of a common adjusting actuator, by which the tool bits are rigidly held, following adjustment, without recourse to any type of locking means.

In multiple tool cutters for machine tool heads heretofore employed it has been necessary, in order to adjust radially the tool bits borne by the cutter, to loosen securing means of one type or another employed to fixedly clamp the tool bits on the cutter, then make the necessary adjustment of the individual tool bits, and then re-tighten the clamping means. It many times happens that the re-clamping of the tool bits disturbs the position of adjustment to which they have been set, entailing a repeated and more careful performance of the adjusting and clamping operation, if desired accuracy of setting and full functioning of all of the several tool bits are to be had. This is, of course, annoying and time consuming, with undue loss of output of the machine tool in question.

It is therefore an object of the invention to provide an adjustment for a machine tool cutter by which tool bits mounted on the cutter are quickly and easily adjusted simultaneously to different effective radial positions and, so adjusted, are positively and rigidly held in position by the actuator which occasioned their adjustment. The result is that loss of setting is impossible, as in hitherto known structures.

Another object is to provide adjusting provisions whereby extremely close tolerance adjustment, to 0.0001 inch, is possible by an anti-friction, line contact type of camming engagement of a conical, threaded rotatable adjusting actuator with several individual rotatable tool bit holders mounted on their supporting member eccentric of its axis. The holders are simultaneously shifted about their own respective axes by this camming action to produce the desired simultaneous and uniform change of the tools relative to the axis of the cutter.

More specifically, it is an object of the invention to provide an improved axial cutter, fixed or rotatable, which is provided outwardly of its axis with a plurality of cylindrical bores whose axes parallel the cutter axis and are in equally spaced distribution circumferentially of the latter; in which individual cylindrical tool bit holders are rotatably received within said bore, being individually spring biased about their own axes by novel torsion spring elements; and in which a conical actuator member is axially threaded in said cutter for camming engagement with the respective cylinders in a direction to rotate the latter individually and simultaneously in opposition to their individual spring biasing means. This varies the radial distance of the tool bits relative to the cutter axis to give the desired adjustment.

Generally, it is an object to provide an adjustment for a cutter as set forth in the preceding paragraph, in which the conical adjusting member has substantially a line contact with the respective tool bit mounting cylinders or holders in camming the same, with minimum frictional opposition to this operation, and in which the tool bit mounting members, as adjusted in opposition to their individual biasing springs, are torsionally thrust and held by the latter against the adjusting cone surface. So held, the adjusting cone serves as an abutment for all of the tool bit holding members, preventing their retrograde movement from adjusted position, as well as sustaining rotative thrust on the tool bits in the machining operation which they perform, without recourse to any further locking or clamping provisions whatsoever.

The foregoing as well as other objects will become more apparent as this description proceeds, especially when considered in connection with the accompanying drawing illustrating a preferred embodiment of the invention, wherein:

Fig. 1 is a forward end elevation, partially broken away, of a cutter equipped with the adjusting provisions of the invention; and Fig. 2 is a view in longitudinal section through the cutter along broken line 2—2 of Fig. 1.

The reference numeral 10 generally designates the cutter of the invention, which is provided with an annular rear flange 11 having suitable provisions in the form of the bayonet slots 12 for releasably securing the same in an entirely conventional manner to a coaxial head of a machine tool. The cylindrical body 13 of cutter 10 is provided with a plurality of elongated bores 14 paralleling its axis, of which four are shown in the illustrated embodiment, these bores being equally distributed circumferentially and radially outwardly of the cutter axis. Each of the bores 14 is counterbored at 15 to provide a cylindrical recess which rotatably receives a cylindrical, block-like tool bit mount or holder 16. The rear or inner surface of this holder abuts an annular, radially extending surface of the counterbored cylinder surrounding the bore 14.

The rear surface of the flange 11 of the cutter 10 is machined to provide a circular recess 17 of substantial axial depth, and a circular spring abutment and anchoring plate 18 is fitted in this recess, in which it is removably secured by machine screws 19.

Plate 17 has four radially outwardly extending slots 20 milled in its inner surface, in equal circumferential spacing therearound, and the slots 20 each receive the rear end of an elongated, leaf-type torsion spring 22 of spring steel. Springs 22 extend the axial length of the respective bores 15 and are received in slots or kerfs 23 machined in the rear of the respective cylindrical tool bit mounting blocks or members 16. As initially installed, the springs 22 are placed under torsional stress by twisting them in the fashion shown in Fig. 2, this stress tending to rotate the cylindrical mounts 16 in clockwise direction in their respective receiving bores 15, as viewed in Fig. 1.

Each of the mounting members or blocks 16 is provided, in a radial plane through the central axis of the head 10, with a radially and axially inclined recess 25 for the reception of a cutter bit or like machine tool bit element 26, which bits project radially outwardly past the respective mounting blocks 16 and the adjacent circumferential portion of cutter body 13. Set screws 27 are threadedly received in the inner ends of the respective bits 26, abutting the bottoms of the recesses 25 and acting as adjustable stops determining the initial radial position of the bits. As thus installed and locked (by the means to be described), the bits 26 are customarily ground as a unit to the desired uniform radius in reference to the axis of cutter 10.

In accordance with the invention, each of the cylindrical, individually rotatable tool bit mounting blocks 16 is provided with a forwardly or axially outwardly projecting, arcuate nose 29, the forward end of which threadedly receives a tool bit locking set screw 30. The screws 30 bear axially to the rear against a flat relieved radial surface 31 on each of the bits 26, thus to clamp the latter to the respective holders 16.

Referring to Fig. 1, each of the nose portions 29 has an inner surface 32 which is arcuate in outline and tapers mildly axially and radially inwardly. These respective surfaces each terminate at a clockwise zone thereof (as viewed in Fig. 1), in a somewhat rounded bearing edge 33; and it is the function of the respective bearing edges 33 to engage and be sustained by the conical outer surface 35 of a central adjusting actuator 36. Actuator 36 has an axial stem extension 37 threadedly engaged at 38 in an axial center bore 39 of the cutter body 13. A coil compression spring 40 acts between the inner end of the stem extention 37 and the bottom of the bore 39 to oppose inward movement of the stem extension and take up possible looseness or end play.

Actually, although the radially inner surface 32 of holder nose 29 is shown as an arcuate and progressively flared one extending across the entire inward face of the nose, it is only necessary that there be radial clearance other than at the line of bearing engagement of the rounded edge 33 with the cone surface 35. Hence the inner actuator surface 32 may be otherwise formed with this in mind, if desired.

The actuator member 36 is provided with a hex-shaped end recess 42 for the reception of a hand wrench in rotatably adjusting the device. An apertured cap or retainer plate 43 of rectangular outline surrounds the actuator 36, and is secured to the cutter body 13 by corner machine screws 44. However, this cap is a removable retainer, pure and simple, and is not intended to serve any function of locking up the parts against becoming loose or out of adjustment. This is the function of actuator 36.

Assume that in use, and with the bits 26 or like tool bits appropriately ground and dressed to desired uniform radius, it is desired to make a fine radial adjustment, of the order of, say, 0.0001 inch as mentioned before. The operator, without performing any further manipulation whatsoever, simply inserts a hand wrench in the hex opening 42 and turns the adjusting actuator cone 36 in the proper direction for the adjustment. That is, if it is desired to increase the radius of the bits 26, the direction of turning is clockwise, as viewed in Fig. 1.

This causes the cone surface 35 of the actuator to advance axially inwardly, due to the threaded engagement of its stem extension 37 with body 13, as the result of which the cone 35 exerts camming action on the bearing edge 33 of each of the mounting blocks 16. The latter are thus individually rotated simultaneously about their respective individual axis at 46, i.e., counterclockwise about those axes as viewed in Fig. 1. The desired increase in radial setting of the tool bits 26 results. A decreased radial setting is accomplished by a reverse rotation of actuator cone 36, and in either of these adjustments the individual torsion springs 22 exert forces urging the bearing edges 33 against the actuator 36, so that no lost motion is possible and the exact setting in which the bits 26 are placed by the adjustment is accurately held during and after the adjustment. The actuator serves as an inner abutment sustaining the cutter bit mounts 16 rigidly for the cutting operation which they perform.

The drawing and the foregoing specification constitute a description of the improved adjustment for machine tool head in such full, clear, concise and exact terms as to enable any person skilled in the art to practice the invention, the scope of which is indicated by the appended claims.

What I claim as my invention is:

1. An adjustable machine tool cutter comprising an axially disposed body having a cylindrical recess disposed parallel to and radially outwardly of the axis of the body, a tool bit mounting member rotatably mounted in said recess, said mouting member being adapted to have a tool bit secured thereon for adjustment as to its radial distance from the body axis by rotation of said mounting member in said recess, an adjusting actuator threadedly and coaxially engaging said body for axial movement upon rotation of the actuator, said actuator having a conical camming surface concentric with the body axis and said mounting member having a surface in restricted, substantially line contact camming engagement with said actuator surface outwardly of the rotative axis of said member in its recess, and spring means biasing said mounting member in a direction to engage it with said camming surface of said actuator.

2. An adjustable machine tool cutter comprising an axially disposed body having a cylindrical recess disposed parallel to and radially outwardly of the axis of the body, a cylindrical tool bit mounting member rotatably mounted in said recess, said mounting member being adapted to have a tool bit secured thereon for adjustment as to its radial distance from the body axis by rotation of said mounting member in said recess, an adjusting actuator threadedly and coaxially engaging said body at the axis thereof for axial movement upon rotation of the actuator, said actuator having a conical camming surface concentric with the body axis and said mounting member having a surface in restricted, substantially line contact camming engagement with said actuator surface outwardly of the rotative axis of said member in its recess, said mounting member having radial clearance relative to said actuator other than at the zone of said restricted engagement, and spring means biasing said mounting member in a direction to engage it with said camming surface of said actuator.

3. An adjustable machine tool cutter comprising an axially disposed body having a cylindrical recess disposed parallel to and radially outwardly of the axis of the body, a cylindrical tool bit mounting member rotatably mounted in said recess, said mounting member being adapted to have a tool bit secured thereon for adjustment as to its radial distance from the body axis by rotation of said mounting member in said recess, an adjusting actuator threadedly and coaxially engaging said body at the axis thereof for axial movement upon rotation of the actuator, said actuator having a conical camming surface concentric with the body axis and said mounting member having a surface in restricted, substantially line contact camming engagement with said actuator surface outwardly of the rotative axis of said member in its recess, and spring means biasing said mounting member in a direction to engage it with said camming surface of said actuator, comprising a leaf spring anchored at opposite ends and under torsional stress with said body and with said mounting member, respectively.

4. An adjustable machine tool cutter comprising an axially disposed body having a plurality of cylindrical recesses disposed parallel to and radially outwardly of the axis of the body, a tool bit mounting member rotatably mounted in each recess, each mounting member being adapted to have a tool bit secured thereon for adjustment as to its radial distance from the body axis by rotation of said mounting member in its recess, an adjusting actuator coaxially and threadedly engaging said body for axial movement of said actuator upon rotation thereof relative to the body, said actuator having a camming surface and said mounting members each having a surface in camming engagement with said actuator surface eccentrically of the rotative axis of the respective members in their recesses, and spring means exerting rotative force on said respective mounting members to urge the same for said camming engagement with said actuator surface.

5. An adjustable machine tool cutter comprising an axially disposed body having a plurality of cylindrical recesses disposed parallel to and radially outwardly of the axis of the body, a cylindrical tool bit mounting member rotatably mounted in each recess, each mounting member being adapted to have a tool bit secured thereon for adjustment as to its radial distance from the body axis by rotation of said mounting member in its recess, an adjusting actuator coaxially and threadedly engaging said body at the axis thereof for axial movement of said actuator upon rotation thereof relative to the body, said actuator having a concentric conical camming surface and said mounting members each having a surface in restricted camming engagement with said conical actuator surface eccentrically of the rotative axis of the respective members in their recesses, and spring means exerting rotative force on said respective mounting members to urge the same for said camming engagement with said actuator surface.

6. An adjustable machine tool cutter comprising an axially disposed body having a plurality of cylindrical recesses disposed parallel to and radially outwardly of the axis of the body, a tool mounting member rotatably mounted in each recess, each mounting member being adapted to have a tool bit secured thereon for adjustment as to its radial distance from the body axis by rotation of said mounting member in its recess, an adjusting actuator coaxially and threadedly engaging said body for axial movement of said actuator upon rotation thereof relative to the body, said actuator having a camming surface and said mounting members each having a surface in camming engagement with said actuator surface eccentrically of the rotative axis of the respective members in their recesses, and spring means exerting rotative force on said respective mounting members to urge the same for said camming engagement with said actuator surface, said spring means comprising a leaf spring for each of said mounting members connected in non-rotative engagement with the same at the rotative axis thereof, and means on said body anchoring the opposite end of said spring against rotation.

7. An adjustable machine tool cutter comprising an axially disposed body having a plurality of cylindrical recesses disposed parallel to and radially outwardly of the axis of the body, a cylindrical tool mounting member rotatably mounted in each recess, each mounting member being adapted to have a tool bit secured thereon for adjustment as to its radial distance from the body axis by rotation of said mounting member in its recess, an adjusting actuator coaxially and threadedly engaging said body at the axis thereof for axial movement of said actuator upon rotation thereof relative to the body, said actuator having a concentric conical camming surface and said mounting members each having a surface in camming engagement with said conical actuator surface eccentrically of the rotative axis of the respective members in their recesses, and spring means exerting rotative force on said respective mounting members to urge the same for said camming engagement with said actuator surface, said spring means comprising a leaf spring for each of said mounting members connected in non-rotative engagement with the same at the rotative axis thereof, and means on said body anchoring the opposite end of said spring against rotation.

8. An adjustable machine tool cutter comprising an axially disposed body having a cylindrical recess disposed parallel to and radially outwardly of the axis of the body, a tool mounting member rotatably mounted in said recess, said mounting member being adapted to have a tool bit secured thereon for adjustment as to its radial distance from the body axis by rotation of said mounting member in said recess, an adjusting actuator engaging said body for movement thereon, said actuator having a surface for camming engagement with a surface of said mounting member outwardly of the rotative axis of said member in its recess, and spring means biasing said mounting member in a direction to engage it with said camming surface of said actuator.

9. An adjustable machine tool cutter, comprising an axially disposed body having a plurality of tool bit holders mounted thereon for adjustment relative thereto and radially outwardly of the body axis, said holders being adapted to have tool bits mounted thereon for simultaneous and equal adjustment as to the radial distance of said bits from the body axis upon said adjustment of the respective holders, and a single adjusting actuator rotatably mounted for axial movement on said body coaxially of the latter, said actuator having means extend-peripherally about a portion thereof and in rotative, axially and radially wedging engagement with surfaces of said holders to variably position said tool bits in the radial sense upon said axial movement of the actuator, and spring means acting on said respective holders to oppose said adjustment and maintain said wedging engagement with said adjusting actuator.

10. An adjustable machine tool cutter, comprising an axially disposed body having a plurality of tool bit holders mounted thereon for rotative adjustment relative thereto on axes paralleling the axis of the body and radially outwardly of the body axis, said holders having wedging surfaces eccentric of the axes thereof and being adapted to have tool bits mounted thereon for simultaneous and equal adjustment as to the radial distance of said bits from the body axis upon said adjustment of the respective holders, and a single adjusting actuator mounted for axial movement on said body coaxially of the latter, said actuator having means extend-peripherally about a portion thereof and in rotative, axially and radially wedging engagement with said surfaces of said holders to adjust the same about the respective axes thereof and variably position said tool bits in the radial sense upon said axial movement of the actuator.

11. An adjustable machine tool cutter, comprising an axially disposed body having a plurality of tool bit holders mounted thereon for rotative adjustment relative thereto on axes paralleling the axis of the body and radially outwardly of the body axis, said holders having wedging surfaces eccentric of the axes thereof and being adapted to have tool bits mounted thereon eccentrically of the individual holder axes for simultaneous and equal adjustment as to the radial distance of said bits from the body axis upon said adjustment of the respective holders, and a single adjusting actuator rotatably mounted for axial movement on said body coaxially of the latter, said actuator having means extend-peripherally about a portion thereof and in rotative, axially and radially wedging engagement with said surfaces of said holders to adjust the same about the respective axes thereof and variably position said tool bits in the radial sense upon said axial movement of the actuator.

12. An adjustable machine tool cutter, comprising an axially disposed body having a plurality of tool bit holders mounted thereon for rotative adjustment relative thereto on axes paralleling the axis of the body and radially outwardly of the body axis, said holders having wedging surfaces eccentric of the axes thereof and being adapted to have tool bits mounted thereon eccentrically of the individual holder axes for simultaneous and equal adjustment as to the radial distance of said bits from the body axis upon said adjustment of the respective holders, a single adjusting actuator rotatably mounted for axial movement on said body coaxially of the latter, said actuator having means extend-peripherally about a portion thereof and in rotative, axially and radially wedging engagement with said surfaces of said holders to adjust the same about the respective axes thereof and variably position said tool bits in the radial sense upon said axial movement of the actuator, and spring means acting on said respective holders to oppose said adjustment and maintain said wedging engagement.

13. An adjustable machine tool cutter, comprising an axially disposed body having a plurality of tool bit members mounted thereon for simultaneous and equal adjustment relative thereto and radially of the body axis, and a single adjusting actuator rotatably mounted for axial movement on said body coaxially of the latter, said actuator having means extending peripherally about a portion thereof and in rotative, axially and radially wedging engagement with surfaces of said members to variably position the latter in the radial sense upon said axial movement of the actuator, and spring means acting on said respective members to oppose said adjustment and maintain said wedging engagement with said adjusting actuator.

References Cited in the file of this patent

UNITED STATES PATENTS

| | | |
|---|---|---|
| 909,401 | Haber | Jan. 12, 1909 |
| 1,241,953 | Finck | Oct. 2, 1917 |
| 1,243,502 | Finck | Oct. 16, 1917 |
| 1,476,927 | Schuman | Dec. 11, 1923 |
| 1,693,778 | Engman | Dec. 4, 1928 |
| 2,712,686 | Heldt | July 12, 1955 |